Sept. 14, 1954 G. J. A. GUYE 2,688,970
APPARATUS FOR VACCINATING BY SCARIFICATION
Filed March 24, 1953
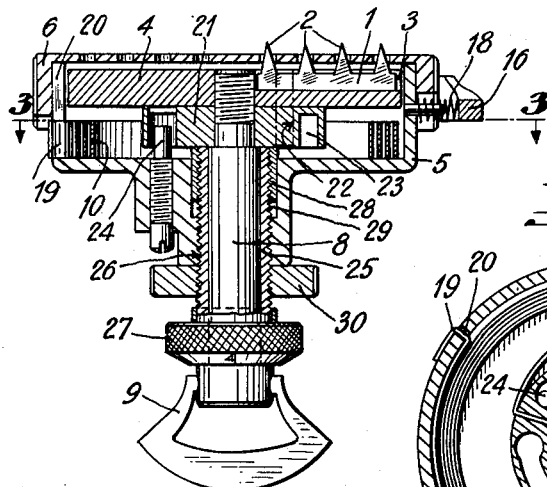
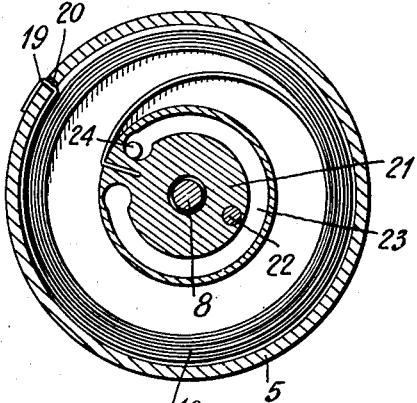
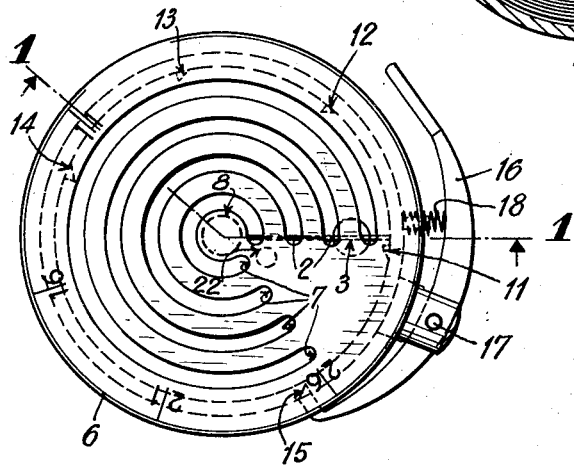
INVENTOR:
GEORGES J. A. GUYE
BY
A. John Michel
ATTORNEY Patented Sept. 14, 1954

2,688,970

UNITED STATES PATENT OFFICE 2,688,970

APPARATUS FOR VACCINATING BY SCARIFICATION

Georges Jean Albert Guye, La Chaux-de-Fonds, Switzerland

Application March 24, 1953, Serial No. 344,347

Claims priority, application Switzerland October 14, 1952

6 Claims. (Cl. 128—333)

The object of the present invention is an apparatus for vaccinating by scarification, to be used in particular for antitubercular vaccination.

The use, for anti-tubercular vaccination, of a sharp instrument, known as a "vaccinostyle," by means of which the operator effects, by hand, horizontal parallel lines or scarifications destined to receive the vaccine, is known. The length of each scarification varies according to the weight of the subject to be vaccinated. This length is chosen in such a manner that the sum of the individual lengths of the scarifications is comprised between 4 and 26 centimeters. This method has the inconvenience of being slow, not very precise and also disagreeable for the subject. It depends on the skill of the operator and requires as many vaccinostyles as there are persons to be vaccinated.

The purpose of the present invention is to remedy these disadvantages, and the apparatus which constitutes its object enables scarifications to be effected mechanically.

This apparatus is characterized in that it comprises a sharp interchangeable member carried by a support rotatably mounted in a circular case and projecting through a wall destined to be applied against the skin of the subject, means to adjust the cutting depth of the said sharp member, means to adjust the angular travel of the support of the sharp member according to the length of the scarification to be effected, and spring means to bring back the said support with the sharp member brusquely to its initial position, in order to effect the scarification.

The accompanying drawing illustrates, by way of example, an embodiment of the apparatus according to the invention.

Fig. 1 is a cross section along the line 1—1 in Fig. 2.

Fig. 2 is a view from above of the apparatus.

Fig. 3 is a cross section along the line 3—3 in Fig. 1.

The apparatus for vaccinating by scarification shown in the drawing is destined for anti-tubercular vaccination and comprises a sharp member destined to effect scarifications in the skin of the subject, as will be described below.

This sharp member is constituted by a blade 1, made, for instance, of steel, and provided with four points 2. The blade 1 is inserted in a radial groove 3 of a disk 4 with the teeth 2 projecting from the surface of the disk, which is rotatably mounted in a circular case 5. The case 5 is closed by a covering member 6, destined to be applied against the skin of the subject to be vaccinated, and provided with four openings 7, in the shape of arcs of concentric circles, for the passage of the teeth 2.

The disk 4 is screwed on to a central arbor 8 the free end of which is provided with a handle 9 which serves to turn the disk 4 whilst simultaneously winding up a spiral spring 10. Four notches 11, 12, 13 and 14 are provided at the periphery of the disk 4, these notches cooperating with a catch 15 provided with a control lever 16 oscillating on an arbor 17 and acted upon by a spring 18. To each of the notches 11, 12, 13 and 14 corresponds a determined angular position of the blade 1, starting from which the teeth of this blade can effect scarifications of a determined length. The covering member 6 bears on its outer face centimetric indications 11, 16, 21 and 26 which correspond to the four possible angular positions of the blade 1. If, for instance, the blade is opposite the indication "16," its points 2 will trace scarifications corresponding to a length of 16 centimeters on the skin of the subject.

The spring 10 is anchored on the one hand to the case 5 by its bent end 19 which is engaged in a slot 20, and on the other, to a part 21 made fast with the disk 4 by means of a pin 22. The part 21 is provided with a groove 23, in the shape of an arc of a circle, and the ends of which cooperate with a stop pin 24 screwed into a boss of the case 5.

In order to enable the depth of cut, i. e. the projection of the points 2 beyond the outer face of the covering member 6, to be adjusted, the disk 4 can slide inside the case 5. A threaded tube 25 is provided for this purpose, this tube being screwed into a tapped hole 26 of a central sleeve which is in one piece with the case 5. This threaded tube 25 is fitted at one end with a milled head 27 and at the other with a bushing 28 which can slide in a boring 29. The head 27 bears a graduation which, in conjunction with a fixed mark on the case, indicates the position of the points of the teeth 2 in relation to the surface of the covering member 6. A lock nut 30 enables the threaded tube 25, and consequently, the head 27, to be locked in the desired position, and a ring 31 prevents the lock nut 30 from being blocked against the head 27.

The apparatus described functions as follows:

Knowing what the length of the scarifications to be effected on the subject to be vaccinated is to be (for instance 16 cm.), this length having been determined according to the weight of the subject, the disk 4 is turned by means of the handle 9 until the blade 1 comes opposite the mark "16" on the covering member 6. There is a snap when the catch 15 engages in the corresponding notch 13. The spring 10 is loaded by being wound on the part 23 which turns in the anti-clockwise direction in Fig. 3, and the end of the groove 23 moves away from the pin 24.

The depth of cut of the points 2 of the blade 1 is then adjusted by means of the head 27, as has been described, and the lock nut 30 is blocked. The operator then applies the apparatus, thus cocked and adjusted, against the skin of the subject to be vaccinated and presses the control lever 16 counter to the action of the spring 15. The disk 4 is thus released and is brought back in a brusque manner to its initial position by the action of the spring 10, taking the blade 1 with it, whose points 2 produce in the skin the scarifications destined to receive the vaccine.

The apparatus described is of a very simple construction, is easy to handle and can easily be taken apart for cleaning and sterilizing. In addition, the easy removal of the covering member 6 enables the blade 1 to be got at without difficulty in order to change it after every vaccination. This apparatus enables scarifications varying in length up to 26 cm. to be effected quickly and painlessly, these scarifications covering a surface of the skin of 16 sq. cm. at the most, whereas with the known methods of vaccination effected by hand a surface of 36 sq. cm. is necessary.

What I claim is:

1. An apparatus for vaccinating by scarification, in particular for anti-tubercular vaccination, comprising a sharp interchangeable member carried by a support rotatably mounted in a circular case and projecting through a wall destined to be applied against the skin of the subject, means to adjust the cutting depth of the said sharp member, means to adjust the angular travel of the support of the sharp member according to the length of the scarification to be effected, and spring means to bring back the said support with the sharp member brusquely to its initial position, in order to effect the scarification.

2. An apparatus according to claim 1, wherein said sharp member is constituted by a steel blade provided with four points destined to form four scarifications in the shape of arcs of concentric circles.

3. An apparatus according to claim 1, wherein said support is constituted by a disk mounted in the case and provided with a radial groove in which said sharp member is inserted with its points protruding from the outer surface of the disk, and the case is closed by a covering member, destined to be applied against the skin of the subject and provided with four openings in the shape of arcs of concentric circles for the passage of the teeth of the blade.

4. An apparatus according to claim 3, wherein the means to adjust the depth of scarification comprises a threaded member cooperating with a tapped part, which is fast with the case, to move the disk towards or away from the covering member.

5. An apparatus according to claim 3, wherein the disk carrying said sharp member is provided at its periphery with notches cooperating with a catch fitted with a control lever, each notch corresponding to a determined angular position of the disk and, consequently, to a determined length of scarification, and a spiral spring is mounted between the case and a part which is fast with the disk in order to bring the latter back to its initial position from a determined angular position when the catch is released from the corresponding notch.

6. An apparatus according to claim 5, wherein said part which is fast with the disk is provided with a groove in the shape of an arc of a circle, the ends of which cooperate with a stop which is fast with the case.

References Cited in the file of this patent

UNITED STATES PATENTS

| Number | Name | Date |
|--------|------|------|
| 931,791 | Niergarth | Aug. 24, 1909 |
| 2,542,828 | Morrison | Feb. 20, 1951 |